(12) United States Patent
Kouzu et al.

(10) Patent No.: US 7,318,577 B2
(45) Date of Patent: Jan. 15, 2008

(54) MOTOR-OPERATED VALVE ASSEMBLY

(75) Inventors: Takahiro Kouzu, Kariya (JP); Tadashi Komiyama, Chiryu (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 11/397,642

(22) Filed: Apr. 5, 2006

(65) Prior Publication Data

US 2006/0226385 A1 Oct. 12, 2006

(30) Foreign Application Priority Data

Apr. 7, 2005 (JP) ............................. 2005-110816

(51) Int. Cl.
*F16K 31/02* (2006.01)
(52) U.S. Cl. ................... 251/129.11; 251/250
(58) Field of Classification Search ........... 251/129.11, 251/129.12, 129.13, 250, 251
See application file for complete search history.

(56) References Cited

U.S. PATENT DOCUMENTS

| | | | |
|---|---|---|---|
| 1,462,160 A * | 7/1923 | Anthony | 123/90.28 |
| 4,951,915 A * | 8/1990 | Piao | 251/14 |
| 5,529,282 A * | 6/1996 | Lebkuchner | 251/129.12 |
| 5,758,684 A * | 6/1998 | Hudson et al. | 137/269 |
| 5,937,835 A | 8/1999 | Turner et al. | |
| 6,145,538 A * | 11/2000 | Park | 137/554 |

* cited by examiner

*Primary Examiner*—John Rivell
*Assistant Examiner*—John K. Fristoe, Jr.
(74) *Attorney, Agent, or Firm*—Nixon & Vanderhye PC

(57) ABSTRACT

A motor-operated valve assembly has a housing, a motor, a driving force transmission means and a valve member. The housing has a fluid passage therein. The motor is installed in the housing. The driving force transmission means has an output rotor rotatably supported by the housing and transmits a driving force of the motor to the output rotor. The valve member is supported by the housing between the motor and the output rotor to be slidable in an axial direction thereof and engaged with the output rotor so that the output rotor slides the valve member to open and close the fluid passage.

10 Claims, 4 Drawing Sheets

MOTOR-OPERATED VALVE ASSEMBLY

CROSS REFERENCE TO RELATED APPLICATION

This application is based upon and claims the benefit of priority of Japanese Patent Application No. 2005-110816 filed on Apr. 7, 2005, the content of which is incorporated herein by reference.

FIELD OF THE INVENTION

The present invention relates to a motor-operated valve assembly that opens and closes a fluid passage.

BACKGROUND OF THE INVENTION

U.S. Pat. No. 5,937,835 and its counterpart JP-H11-62724-A, for example, discloses a conventional motor-operated valve assembly, which drives an valve member to open and close a fluid passage. The motor-operated valve assembly is incorporated in an exhaust gas recirculation (EGR) system for recirculating an exhaust gas from an exhaust passage to an intake passage of a diesel engine, for example.

In the motor-operated valve assembly according to U.S. Pat. No. 5,937,835, a speed reduction mechanism transmits driving force to actuate its valve member. That is, a gear train transmits the driving force of an electric motor. The driving force is transmitted via a sector gear and a cylindrical protruding portion to a valve assembly. The rotational driving force of the electric motor is transformed into a driving force to reciprocate the valve assembly in its axial direction in this manner. As a result, the valve assembly reciprocates in the axial direction to open and close a fluid passage.

However, in the motor-operated valve assembly shown in U.S. Pat. No. 5,937,835, the valve assembly is located outside a motor gear and the gear train. That is, the valve assembly is arranged at an opposite side from an output shaft of the electric motor with respect to the gear train. Thus, a support portion, which supports the valve assembly slidably in the axial direction, is located at an opposite side from the electric motor with respect to the gear train, to upsize a body size of the motor-operated valve assembly. Further, the support portion for supporting the valve assembly is separately located at an opposite side from the electric motor with respect to the gear train in an actuator housing. Thus, the actuator housing requires an enough stiffness to form the support portion. As a result, a wall thickness of the actuator housing becomes large to upsize the body side of the actuator housing.

SUMMARY OF THE INVENTION

The present invention is achieved in view of the above-described issues, and has an object to provide a motor-operated valve assembly that has a relatively small size and relatively large stiffness.

The motor-operated valve assembly has a housing, a motor, a driving force transmission means and a valve member. The housing has a fluid passage therein. The motor is installed in the housing. The driving force transmission means has an output rotor rotatably supported by the housing and transmits a driving force of the motor to the output rotor. The valve member is supported by the housing between the motor and the output rotor to be slidable in an axial direction thereof and engaged with the output rotor so that the output rotor slides the valve member to open and close the fluid passage.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

First Embodiment

Figure 1:
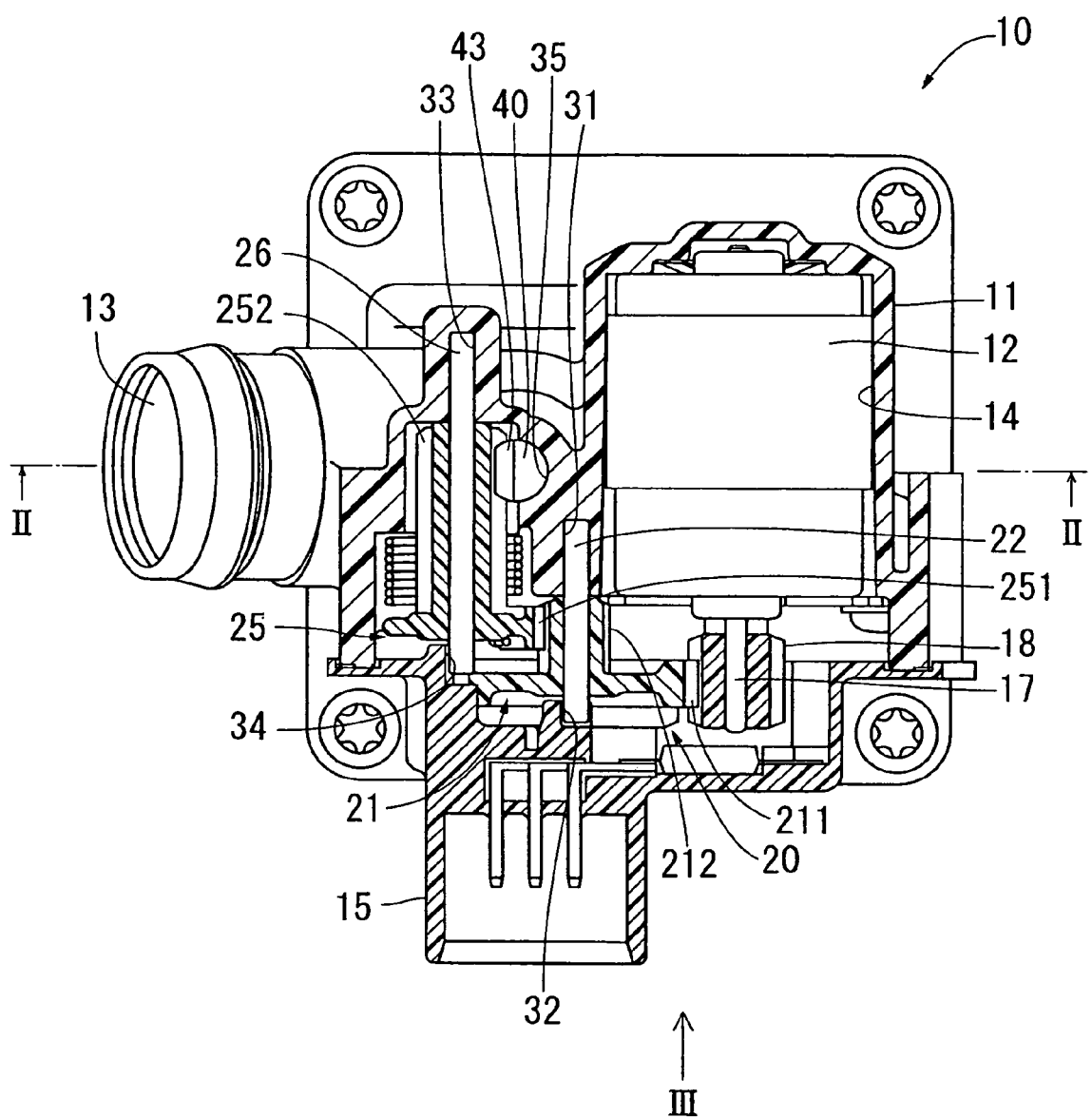
FIG. 1 is a cross-sectional view showing a motor-operated valve assembly according to a first embodiment of the present invention.

A flow path switching apparatus, which includes a motor-operated valve assembly according to a first embodiment of the present invention, is described in the following, referring to FIGS. 1 to 3. The flow path switching apparatus 10 is incorporated, for example, in the motor-operated valve assembly for opening and closing a secondary air passage that leads a secondary air pressure supplied by an air pump to a three way catalytic converter. The flow path switching apparatus 10 has a housing 11, an electric motor 12, a driving force transmission means 20 and a shaft valve 40 that serves as a valve member. The housing 11 is made of resin, to have a fluid passage 13 and a motor installation chamber 14, which installs the electric motor, therein.

A cover 15 and a case 16 are integrally attached to the housing 11. The cover 15 is attached to the housing 11 to cover the electric motor 12 and the driving force transmission means 20. The case 16 is attached under the housing 11 in FIG. 2 so that the housing 11 and the case 16 integrally form the fluid passage 13. The cover 15 and the case 16 are made of resin as the housing 11 is. Alternatively, the housing 11, the cover 15 and the case 16 may be made of metal instead of resin.

The electric motor 12 is a conventional DC motor or AC motor. The electric motor 12 has an output shaft 17, which rotates by energizing the electric motor 12. A pinion 18 is provided on a leading end of the output shaft 17. As mentioned above, the electric motor 12 is installed in the motor installation chamber 14 formed in the housing 11. The motor installation chamber 14 of the housing 11 installs a body portion of the electric motor 12, which is opposite from the pinion 18 in an axial direction of the output shaft 17.

The driving force transmission means 20 transmits a driving force of the electric motor 12 to a shaft valve 40. The driving force transmission means 20 has a transmission gear 21 and an output gear 25, which corresponds to a transmission member according to the present invention. The transmission gear 21 is rotatably installed about a shaft 22. The transmission gear 21 is located between the electric motor 12 and the output gear 25. As shown in FIG. 3, the transmission gear 21 has first cogs 211 and second cogs 212. The shaft 22 is approximately in parallel with the output shaft 17 of the electric motor 12. One axial end portion of the shaft 22 is rotatably supported by a bearing portion 31, which is formed in the housing 11. The other axial end portion of the shaft 22 is rotatably supported by a bearing portion 32, which is formed in the cover 15. The first cogs 211 of the transmission gear 21 are engaged with the pinion 18, which is provided on the output shaft 17 of the electric motor 12. The transmission gear 21 may be rotatable relative to the shaft 22. In this case, the one axial end portion of the shaft 22 is supported by the bearing portion 31, and the other axial end portion of the shaft 22 is press-fitted to the bearing portion 32.

The output gear 25 is rotatable about a shaft 26. The output gear 25 is located at an opposite side from the electric motor 12 so that the electric motor 12 and the output gear 25 interpose the transmission gear 21 therebetween. The output gear 25 has first cogs 251 and second cogs 252. The shaft 26 is approximately in parallel with the output shaft 17 of the electric motor 12 and the shaft 22 of the transmission gear 21. One axial end portion of the shaft 26 is rotatably supported by a bearing portion 33, which is formed in the housing 11. The other axial end portion of the shaft 26 is rotatably supported by a bearing portion 34, which is formed in the cover 15. The first cogs 251 of the output gear 25 are engaged with the second cogs of the transmission gear 21. In the first embodiment, as shown in FIG. 3, the first cogs 251 of the output gear 25 are provided in a part of a circumference of the output gear 25, corresponding with a rotation angle of the output gear 25. Alternatively, the first cogs 251 of the output gear 25 may be provided over an entire circumference of the output gear 25. Further, the output gear 25 may be rotatable relative to the shaft 26. In this case, the one axial end portion of the shaft 26 is supported by the bearing portion 33, and the other axial end portion of the shaft 26 is press-fitted to the shaft portion 34.

The shaft valve 40 has a shaft portion 41 and a valve portion 42. The shaft portion 41 is supported by a support portion 35, which is formed in the housing 11, so that the shaft valve 40 is slidable in an axial direction of the shaft portion 41. As shown in FIG. 2, the shaft valve 40 has the valve portion 42 at one axial end portion thereof and a cog portion 43 at the other axial end portion thereof. Cogs of the cog portion 43 are provided on a side of the shaft portion 41 along the axial direction, to be engaged with the second cogs 252 of the output gear 25. When the output gear 25 rotates, the driving force is transmitted from the second cogs 252 of the output gear 25 to the cog portion 43 of the shaft valve 40. That is, the driving force of the output gear 25 is inputted at the cog portion 43 into the shaft valve 40. The valve portion 42 has a seal portion 44, which can seat on a valve seat 36 formed in the housing 11. In the first embodiment, the seal portion 44 is a member separately formed from the shaft valve 40. A downward movement of the shaft valve 40 seats the seal portion 44 of the valve portion 42 on the valve seat 36 of the housing 11, to close the fluid passage 13. An upward movement of the shaft valve 40 lifts the seal portion 44 of the valve portion 42 off the valve seat 36 of the housing 11, to open the fluid passage 13.

Figure 2:
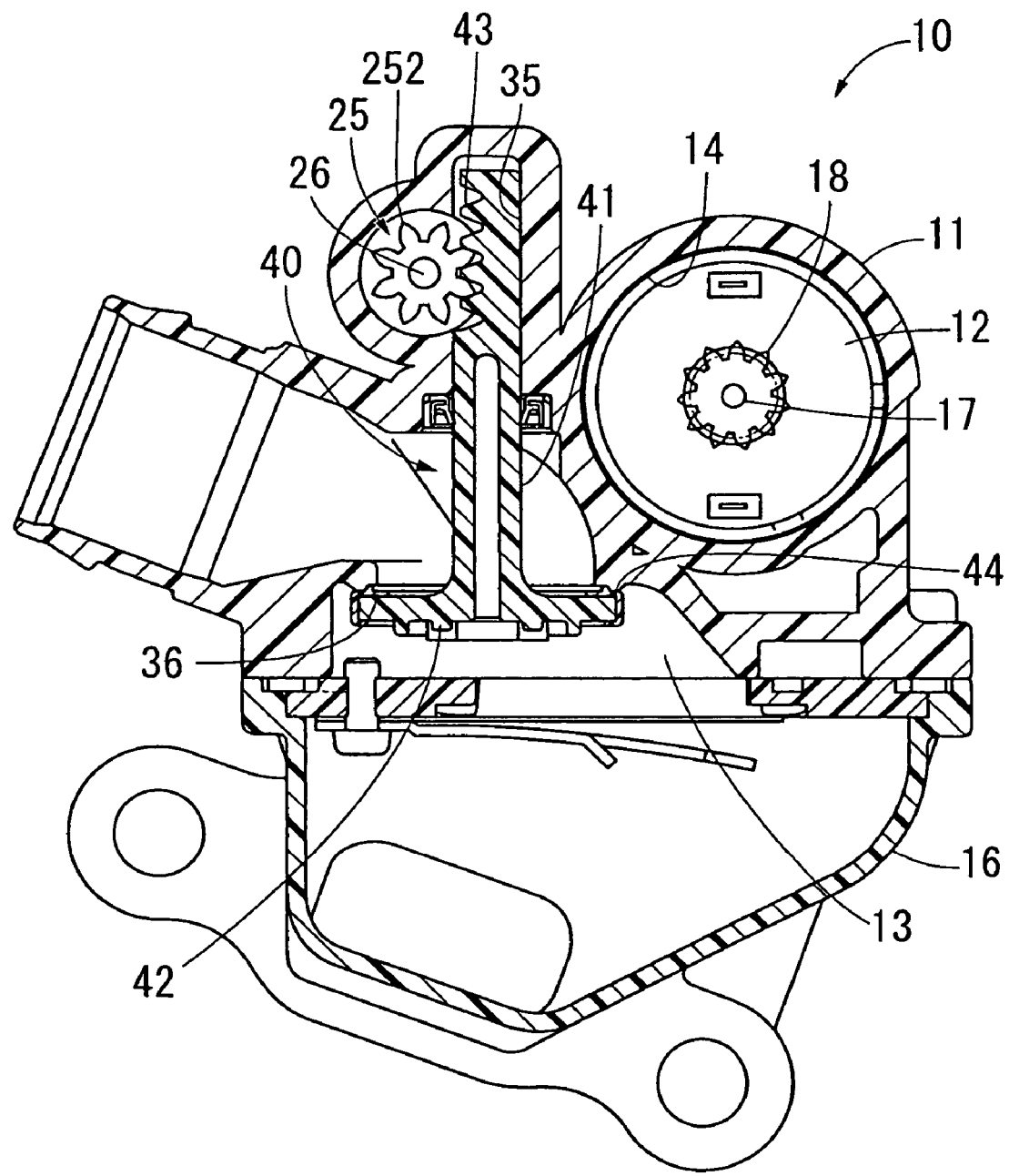
FIG. 2 is another cross-sectional view of the motor-operated valve assembly according to the first embodiment, taken along line II-II in FIG. 1.
Figure 3:
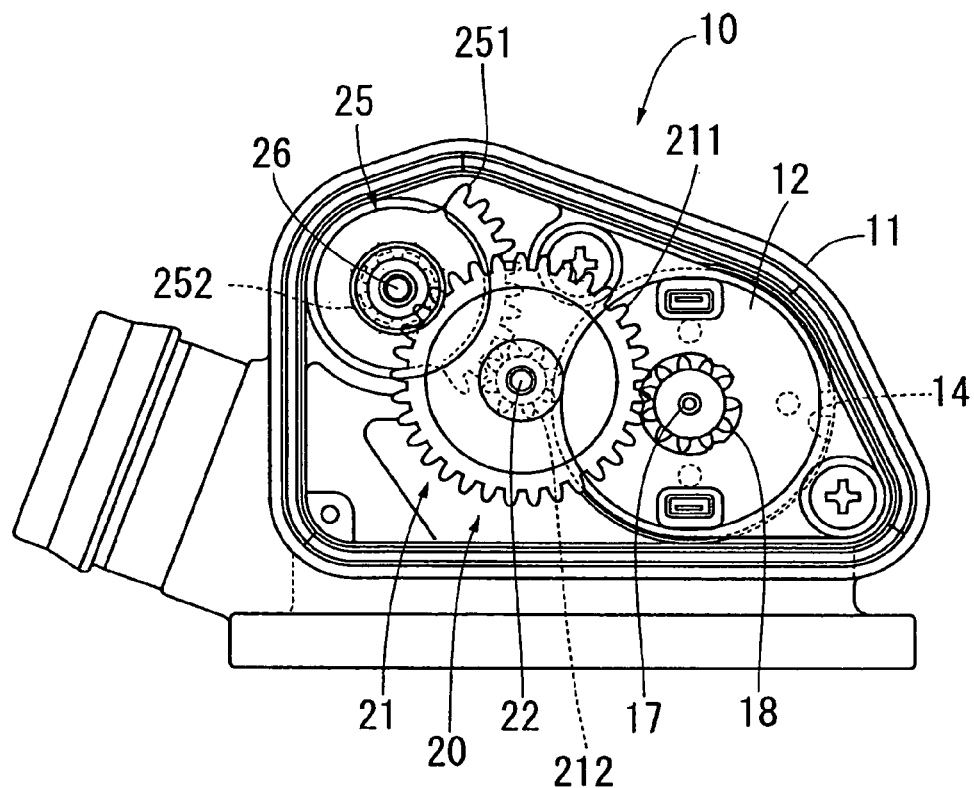
FIG. 3 is a side view of the motor-operated valve assembly according to the first embodiment, in which a cover is removed and seen in a direction of arrow III in FIG. 1.
Figure 4:
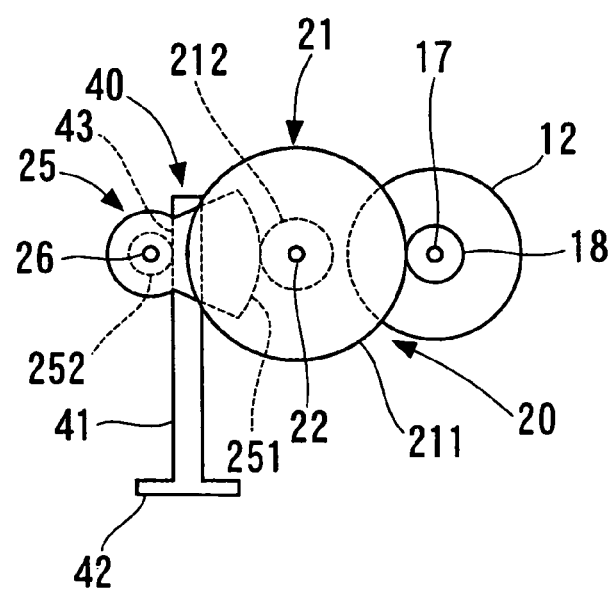
FIG. 4 is a schematic diagram showing constructions of a motor, a gear train, an output rotor and a shaft valve in the motor-operated valve assembly according to the first embodiment.

As shown in FIGS. 1, 2 and 4, the shaft valve 40 is located between the transmission gear 21 and the output gear 25. FIG. 4 schematically depicts constructions of the electric motor 12, the transmission gear 21, the output gear 25 and the shaft valve 40, that is, a transmission path of the driving force. The shaft valve 40 is arranged along a direction approximately perpendicular to the output shaft 17 of the electric motor 12, the shaft 22 of the transmission gear 21 and the shaft 26 of the output gear 25. As shown in FIG. 1, the shaft valve 40 is located at an opposite side from the cover 15. That is, the shaft valve 40 is located at the same side as the electric motor 12 in the housing 11. The driving force of the electric motor 12 is transmitted via the pinion 18, the transmission gear 21 and the output gear 25 to the shaft valve 40. The shaft valve 40 has the cog portion 43, which extends in the axial direction of the shaft portion 41. Thus, when the driving force of the electric motor 12 rotates the output gear 25, the shaft valve 40, which is engaged with the output gear 25 at the cog portion 43, moves in the axial direction. Accordingly, a rotation of the output shaft 17 of the electric motor 12 is decelerated by the driving force transmission means 20 and transformed into an axial motion to reciprocate the shaft valve 40. That is, the shaft valve 40 reciprocates in a direction perpendicular to the output shaft 17 of the electric motor 12, the shaft 22 of the transmission gear 21 and the shaft 26 of the output gear 25.

In the above-described first embodiment, the shaft valve 40 is located between the transmission gear 21 and the output gear 25. Accordingly, the support portion 35 of the housing 11, which support the shaft valve 40, is placed between the bearing portion 31 of the transmission gear 21 and the bearing portion 33 of the output gear 25. The housing 11, which has the bearing portions 31, 33 to support the shafts 22, 26, has a relatively large wall thickness in proximities to the bearing portion 31 and the bearing portion 33. The he support portion 35 of the housing 11, which supports the shaft valve 40, is suitable for securing the relatively large wall thickness. As a result, it is possible to improve a stiffness of the housing 11, especially at the support portion 35 to support the shaft valve 40.

Further, the support portion 35 of the housing 11, which supports the valve shaft 40, essentially has an enough wall thickness to provide the bearing portions 31, 33. Thus, even if the housing 11 has a large wall thickness at the support portion 35 to support the shaft valve 40, the large wall thickness does not cause an upsizing of an entire body of the housing 11. Accordingly, it is possible to improve the stiffness of the housing 11, without increasing the size of the housing 11.

Furthermore, in the first embodiment, the shaft valve 40 is located between the transmission gear 21 and the output gear 25. Thus, a space for installing the shaft valve 40 is not necessary in particular in housing 11. Accordingly, the electric motor 12, the transmission gear 21, the output gear 25 and the shaft valve 40 are efficiently installed in the housing 11, not to increase the size of the housing 11.

Second Embodiment

Figure 5:
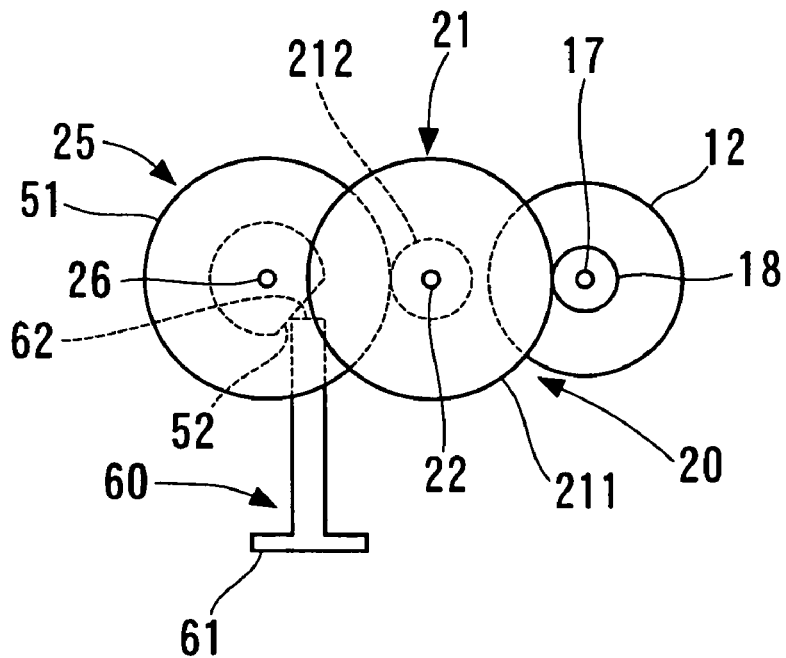
FIG. 5 is a schematic diagram showing constructions of a motor, a gear train, an output rotor and a shaft valve in a motor-operated valve assembly according to a second embodiment of the present invention.

FIG. 5 schematically depicts a flow path switching apparatus 20 of a motor-operated valve assembly according to a second embodiment of the present invention. The elements substantially as same as those in the first embodiment are assigned with referential numerals, and not especially described again.

As shown in FIG. 5, the flow path switching apparatus 10 in the second embodiment has an electric motor 12, a transmission gear 21, a transmission member 50 and a shaft valve 60. FIG. 5 schematically shows constructions of the electric motor 12, the transmission gear 21, the transmission member 50 and the shaft valve 60, that is, a transmission path of the driving force. The transmission member 50 has a cog portion 51 and a cam portion 51. The cog portion 51 is engaged with second cogs 212 of the transmission gear 21. The cam portion 51 is in contact with an end portion 62 of the shaft valve 60, which is provided at an opposite side from a valve portion 61 in an axial direction of the shaft valve 60. Transmission member 50, the cog portion 51 of which is engaged with the second cogs 212 of the transmission gear 21, rotates in accordance with a rotation of the transmission gear 21. In accordance with the rotation of the transmission member 50, the cam portion 51 reciprocates the shaft valve 60 in its axial direction. That is, the driving force is transmitted from the output gear 25 into the shaft valve 60 at the end portion 62. The flow path switching apparatus 10 in the second embodiment may be provided with an elastic member to urge the shaft valve 60 that opens and closes a fluid passage 13.

Third Embodiment

Figure 6:
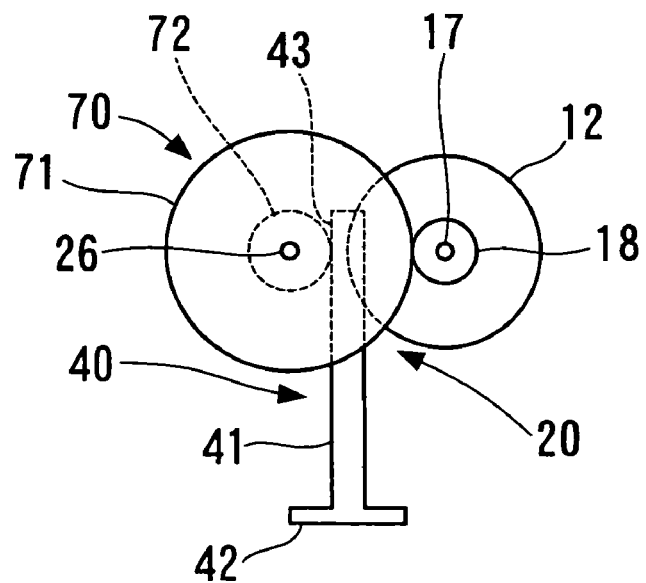
FIG. 6 is a schematic diagram showing constructions of a motor, an output rotor and a shaft valve in a motor-operated valve assembly according to a third embodiment of the present invention.

FIG. 6 schematically depicts a flow path switching apparatus 20 of a motor-operated valve assembly according to a third embodiment of the present invention. The elements substantially as same as those in the first embodiment are assigned with referential numerals, and not especially described again.

As shown in FIG. 6, the flow path switching apparatus 10 in the third embodiment has a construction of a driving force transmission means 20, which is differently configured from that in the first embodiment. The driving force transmission means 20 in the third embodiment includes substantially only the output gear 70, which corresponds to a transmission member in the present invention. FIG. 6 schematically depicts constructions of the electric motor 12, the output gear 70 and the shaft valve 40, that is, a transmission path of the driving force. The output gear 70 has first cogs 71 and second cogs 72. The output gear 70 rotates about a shaft 26, which is arranged approximately in parallel with an output shaft 17 of an electric motor 12. The driving force transmission means 20 in the third embodiment is not provided with the transmission gear in the first and second embodiments, so that the first cogs 71 of the output gear 70 is directly engaged with a pinion 18, which is provided on the output shaft 17 of the electric motor 12. The second cogs 72 of the output gear 70 are engaged with a cog portion 43 of the shaft valve 40. In the third embodiment, the shaft valve 40 is located between the electric motor 12 and the output gear 70.

The driving force transmission means 20 in the third embodiment has a simple construction, and a space between the electric motor 12 and the output gear 70 is relatively small. This construction serves to decrease a body size of the housing 11. Further, even if the housing 11 has a large wall thickness at the support portion 35 to support the shaft valve 40 to improve the stiffness of the housing 11, the large wall thickness does not cause an upsizing of the housing 11. Accordingly, it is possible to downsize the housing 11 further and to improve the stiffness of the housing 11.

This description of the invention is merely exemplary in nature and, thus, variations that do not depart from the gist of the invention are intended to be within the scope of the invention. Such variations are not to be regarded as a departure from the spirit and scope of the invention.

What is claimed is:

1. A motor-operated valve assembly comprising:
   a housing integrally formed as a unitary structure that defines fluid passage, a motor installation chamber, an output gear support portion and a valve support portion therein;
   a motor installed in the motor installation chamber of the housing, the motor having an output shaft and a pinion fixed to the output shaft;
   a driving force transmission means that has an output gear rotatably supported by the output gear support portion of the housing to transmit a driving force of the motor from the pinion of the motor to a cog portion engaged therewith; and
   a valve member supported by the valve support portion of the housing and having the cog portion engaged with the output gear so that the valve member is driven by the driving force of the motor to slide in an axial direction thereof to open and close the fluid passage, wherein:
   the output gear and the pinion of the motor extend in parallel with each other;
   the driving force transmission means comprises a gear train disposed in a space of the housing between the output gear and the pinion of the motor to be engaged therewith; and
   the valve support portion is disposed in a space of the housing between the output gear support portion and the motor installation chamber.

2. The motor-operated valve assembly according to claim 1, wherein the valve member has:
   an input portion at one end portion in the axial direction that has the cog portion engaged with the output gear; and
   a valve portion at the other end portion in the axial direction that opens and closes the fluid passage.

3. The motor-operated valve assembly according to claim 1, wherein the output gear extends approximately perpendicular to the axial direction in which the valve member slides.

4. The motor-operated valve assembly according to claim 1, wherein the housing is made of resinous material.

5. A motor-operated valve assembly comprising:
   a housing integrally formed as a unitary structure that defines a fluid passage, a first chamber, a second chamber and a third chamber therein;
   a motor having a motor shaft, the motor being disposed in the first chamber;
   a driving force transmission means having an output rotor engaged with the motor shaft of the motor and an output rotor that is rotatably supported by the second chamber; and
   a valve member having a sliding portion supported by the third chamber and engaged with the output rotor so that the valve member is driven by the output rotor to slide in an axial direction thereof to open and close the fluid passage, wherein:
   the third chamber is disposed in a space of the housing between the first chamber and the second chamber, whereby the valve member is disposed between the output rotor and the motor.

6. A motor-operated valve assembly as in claim 5, wherein the housing has a fourth chamber by which the input rotor is rotatably supported.

7. A motor-operated valve assembly as in claim 5, wherein the output rotor and the valve member respectively have cog portions that are engaged with each other.

8. A motor-operated valve assembly according to claim 5, wherein the output rotor has a cam portion that is engaged with the valve member.

9. A motor-operated valve assembly according to claim 5, wherein the housing is made of resinous material.

10. A motor-operated valve assembly according to claim 5, wherein the third chamber is disposed between the second chamber and the fourth chamber.

* * * * *